(12) United States Patent  
Grancharov et al.

(10) Patent No.: US 12,056,923 B2  
(45) Date of Patent: Aug. 6, 2024

(54) METHOD FOR GENERATING AN AUGMENTED VIDEO

(71) Applicant: Telefonaktiebolaget LM Ericsson (publ), Stockholm (SE)

(72) Inventors: Volodya Grancharov, Solna (SE); Jiangpeng Tao, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 487 days.

(21) Appl. No.: 17/291,077

(22) PCT Filed: Nov. 6, 2018

(86) PCT No.: PCT/EP2018/080314  
§ 371 (c)(1),  
(2) Date: May 4, 2021

(87) PCT Pub. No.: WO2020/094215  
PCT Pub. Date: May 14, 2020

(65) Prior Publication Data  
US 2022/0398810 A1 Dec. 15, 2022

(51) Int. Cl.  
*G06V 20/00* (2022.01)  
*G06T 3/40* (2006.01)  
(Continued)

(52) U.S. Cl.  
CPC .............. *G06V 20/20* (2022.01); *G06T 3/40* (2013.01); *G06T 7/70* (2017.01); *G06T 19/006* (2013.01);  
(Continued)

(58) Field of Classification Search  
CPC ........ G06V 20/20; G06V 10/774; G06T 3/40; G06T 7/70; G06T 19/006; G06T 2207/20081; G06F 18/2413; G06F 18/254  
See application file for complete search history.

(56) References Cited

U.S. PATENT DOCUMENTS

2020/0051254 A1* 2/2020 Habibian .................. G06T 7/75

OTHER PUBLICATIONS

Han et al, Seq-NMS for Video Object Detection, arXiv:1602.08465v3 Aug. 22, 2016.*  
(Continued)

*Primary Examiner* — Ping Y Hsieh  
*Assistant Examiner* — Xiao Liu  
(74) *Attorney, Agent, or Firm* — COATS & BENNETT, PLLC

(57) ABSTRACT

This disclosure provides a method performed by a portable computer device configured to generate an augmented reality video. The device detects first object proposal region information, based on a frame of a video, using a first trained model configured to provide object proposal regions having an accurate width. The device also detects, based on the frame of the video, second object proposal region information using a second trained model configured to provide object proposal regions having an accurate height. The device then determines combined object proposal region information by combining overlapping object proposal regions of the first and second object proposal region information and generates an augmented reality video by generating an augmented frame. The augmented frame is generated by overlaying object proposal regions that are in the combined object proposal region information onto the frame of the video and adding the augmented frame to the augmented reality video

15 Claims, 8 Drawing Sheets

(51) Int. Cl.
  *G06T 7/70* (2017.01)
  *G06T 19/00* (2011.01)
  *G06V 10/774* (2022.01)
  *G06V 20/20* (2022.01)
(52) U.S. Cl.
  CPC .. *G06V 10/774* (2022.01); *G06T 2207/20081* (2013.01)

(56) References Cited

OTHER PUBLICATIONS

Wang et al, Point Linking Network for Object Detection, arXiv:1706.03646v2 (Year: 2017).*

Yang, S. et al., "It takes two to tango: Cascading off-the-shelf face detectors", IEEE/CVF Conference on Computer Vision and Pattern Recognition Workshops, 1pp. 648-656, Jun. 8, 2018.*

Lee, H. et al., "Dynamic Belief Fusion for Object Detection", IEEE Winter Conference on Applications of Computer Vision, pp. 1-9, Mar. 7, 2016.*

Rao et al, A Mobile Outdoor Augmented Reality Method Combining Deep Learning Object Detection and Spatial Relationships for Geovisualization, Sensors, 17, 1951; doi:10.3390/s17091951 (Year: 2017).*

Rothe, R. et al., "Non-Maximum Suppression for Object Detection by Passing Messages between Windows", Asian Conference on Computer Vision, Apr. 16, 2015, pp. 1-16.

Yang, S. et al., "It takes two to tango: Cascading off-the-shelf face detectors", IEEE/CVF Conference on Computer Vision and Pattern Recognition Workshops, Jun. 18, 2018, pp. 648-656.

Lee, H. et al., "Dynamic Belief Fusion for Object Detection", IEEE Winter Conference on Applications of Computer Vision, Mar. 7, 2016, pp. 1-9.

Karaoglu, S. et al., "Detect2Rank: Combining Object Detectors Using Learning to Rank", Cornell University Library, Dec. 26, 2014, pp. 1-13.

Viola P. et al., "Rapid Object Detection using a Boosted Cascade of Simple Features", Accepted Conference on Computer Vision and Pattern Recognition, 2001, pp. 1-9.

Dollár, P., et al., "Fast Feature Pyramids for Object Detection", IEEE Transactions on Pattern Analysis and Machine Intelligence, Aug. 2014, pp. 1532-1545, vol. 36, No. 8.

* cited by examiner

810: detecting first object proposal region information using a first trained model based on a frame of a video, the first trained model configured to provide object proposal regions having an accurate width.

820: detecting second object proposal region information using a second trained model based on the frame of the video, the second trained model configured to provide object proposal regions having an accurate height.

830: determining combined object proposal region information, by combining object proposal regions of the first object proposal region information overlapping with object proposal regions of the second object proposal region information.

840: generating an augmented reality video by generating an augmented frame, wherein the augmented frame is generated by overlaying object proposal regions comprised in the combined object proposal region information onto the frame of the video and adding the augmented frame to the augmented reality video.

Fig. 8

METHOD FOR GENERATING AN AUGMENTED VIDEO

TECHNICAL FIELD

The present invention relates to a method for generating a video. The invention further relates to a computer performing the method.

BACKGROUND

For users or technicians working with electric equipment, identifying a correct equipment feature, such as a control or connector, may be a complex and cumbersome task. When performing such work, the technicians are typically mobile and are forced to bring with them the required tools or aids required to perform the work. Examples of such tools may be a smartphone or a tablet computer provided with a video camera.

Visual object detectors, e.g. in the form of a computer or video processor, may be used to automatically identify and localize objects, such as features of electric equipment, that may appear in frames of a video. The object detector typically provides a position of the object, a size of the object and the type of the object, or any combination of these. The object detector may typically also provide object proposal regions, e.g. in the form of bounding boxes, that enclose each detected object.

The type of the object may be recognized as an object class, for example a connector, a control or a label. Automatically identifying and localizing objects in frames of a video is an essential step in many Augmented Reality (AR) and security applications.

Some state-of-the-art object detectors are based on Convolutional Neural Networks, CNN. An example can be found in S. Ren, K. He, R. Girshick, and J. Sun, "*Faster R-CNN: Towards real-time object detection with region proposal networks*," IEEE Trans. Pattern Analysis and Machine Intelligence, 2017. A further example may be found in W. Liu, D. Anguelov, D. Erhan, C. Szegedy, S. Reed, C. Fu, and A. Berg, "*SSD: Single shot multibox detector*" in Proc. European Conference Computer Vision, 2016. Yet an example may be found in J. Redmon and A. Farhadi, "*YOLO9000: Better, faster, stronger*" in Proc. IEEE Conf. Computer Vision and Pattern Recognition, 2017.

A drawback of such CNN methods are that they are computationally complex and not suitable when performing object detection in mobile devices, such as smartphones or tablet computers.

Other methods use object detection based on sliding classification window. Among the most commonly used solutions are Viola-Jones detector and Aggregated Channel Features (ACF) detector. The three main reasons for their popularity are low computational complexity requirements, simplicity in re-training and extending with new classes, and ability to build models with smaller data sets in comparison to the amount of data needed to train CNNs. Descriptions of such sliding classification window object detectors can be found in P. Viola and M. Jones, "Rapid object detection using a boosted cascade of simple features", in Proc. IEEE Conf. Computer Vision and Pattern Recognition, 2001 and in P. Dollar, R. Appel, S. Belongie, and P. Perona, "Fast feature pyramids for object detection", IEEE Transactions on Pattern Analysis and Machine Intelligence, 2014.

The main concept of sliding classification window type detectors is to apply a classification window on multiple locations in the image, and in this way identify an object of interest and its location. Problems with multiple responses from the same object from neighboring classifiers are solved by means of Non-Maximal Suppression, NMS, methods. An example of NMS methods can be found in R. Rothe, M. Guillaumin, and L. Van Gool, "Non-maximum suppression for object detection by passing messages between windows," Proc. Asian Conf. Computer Vision, 2014. The problem of various object sizes is solved by running a fixed size sliding classification window on multi-scale image pyramid, or approximating this process with computationally efficient algorithms.

Drawbacks of such conventional methods include that the aspect ratio of ground truth varies significantly due to perspective transformation or pose of a detected visual object. The object proposal regions or bounding boxes resulting from object detection are typically provided with a constant presupposed aspect ratio and cannot fit all objects seen from different viewing angles and distances in an accurate manner.

A further problem is that, even when analyzing videos depicting static objects, e.g. depicting fixed hardware components, the aspect ratio of an object to be detected changes significantly due to variations in camera position or viewing angle of the camera.

It is desirable for a user or technician to be able to identify features of electric equipment using available equipment, such as a mobile device.

Thus, there is a need for an improved method for identifying features of electric equipment.

OBJECTS OF THE INVENTION

An objective of embodiments of the present invention is to provide a solution which mitigates or solves the drawbacks described above.

SUMMARY OF THE INVENTION

The above objective is achieved by the subject matter described herein. Further advantageous implementation forms of the invention are described herein.

According to a first aspect of the invention, the above mentioned objectives are achieved by a method performed by a portable computer device configured to generate an augmented reality video, the method comprising detecting first object proposal region information using a first trained model based on a frame of a video, the first trained model configured to provide object proposal regions having an accurate width, detecting second object proposal region information using a second trained model based on the frame of the video, the second trained model configured to provide object proposal regions having an accurate height, determining combined object proposal region information, by combining object proposal regions of the first object proposal region information overlapping with object proposal regions of the second object proposal region information, generating an augmented reality video by generating an augmented frame, wherein the augmented frame is generated by overlaying object proposal regions comprised in the combined object proposal region information onto the frame of the video and adding the augmented frame to the augmented reality video.

At least one advantage of this aspect of the disclosure is that improved localization of visual objects in a video is achieved. A further advantage is that improved localization of visual objects in a video captured at varying viewing angles. A further advantage is that consistency of detected object location and/or object boundaries are improved.

According to a second aspect of the invention, the above mentioned objectives are achieved by a computer performing the method according to the first aspect.

The advantages of the second aspect are at least the same as the advantages of the first aspect.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 8 shows a flowchart of a method according to one or more embodiments.

Figure 1:
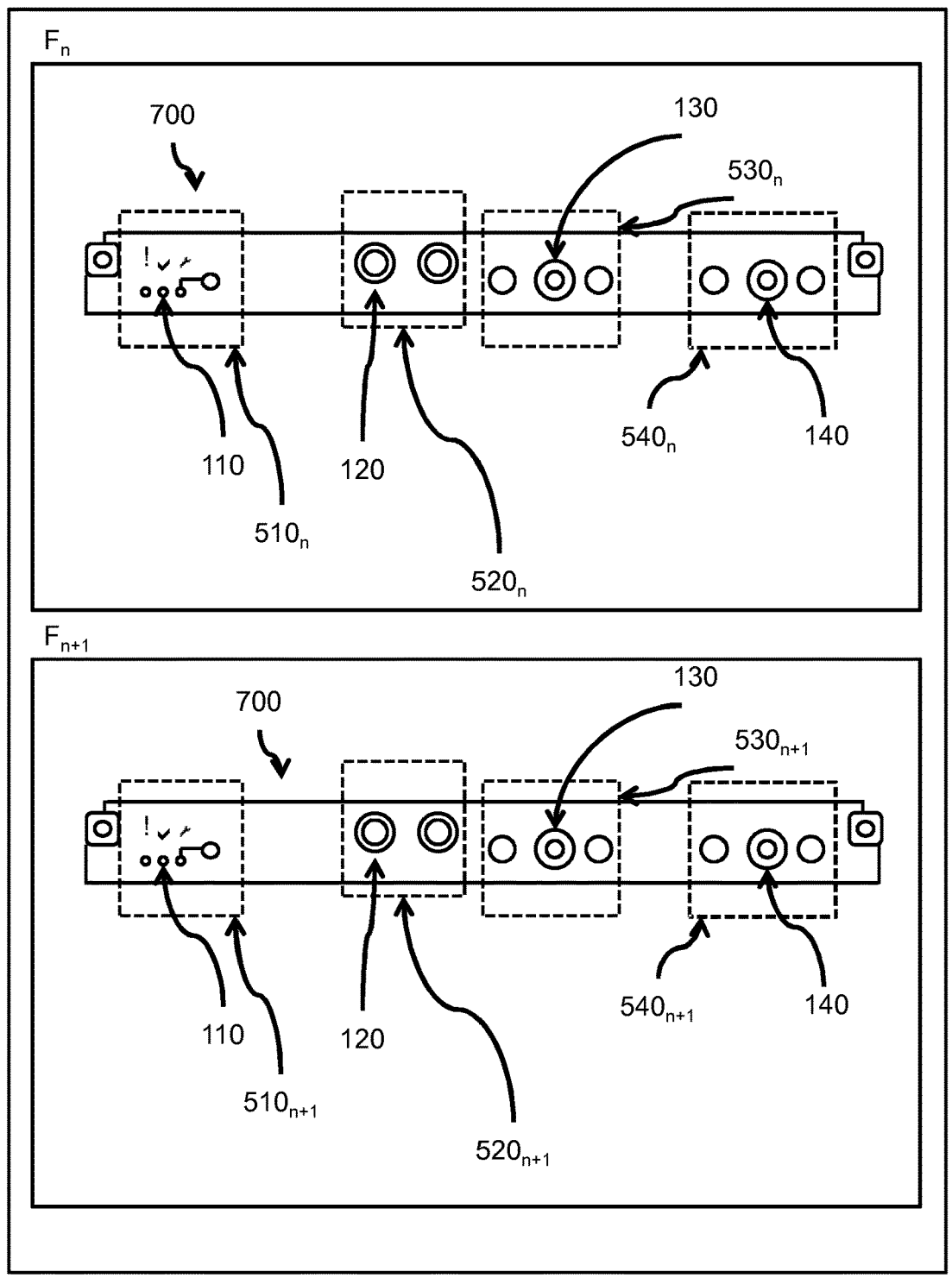
FIG. 1 illustrates objects detected in a video according to one or more embodiments.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In this disclosure the term "trained model" denotes a model capable of detecting objects in a frame of a video, Examples are described in "Rapid object detection using a boosted cascade of simple features", in Proc. IEEE Conf. Computer Vision and Pattern Recognition, 2001 and in P. Dollar, R. Appel, S. Belongie, and P. Perona, "Fast feature pyramids for object detection", IEEE Transactions on Pattern Analysis and Machine Intelligence, 2014. The trained model typically provides object proposal regions enclosing detected objects.

The trained model may e.g. comprise a number of weights to combine image features extracted from a frame of a video. This enables the trained model to classify/detect an object using the image/frame features. The image/frame features could be any low-level features, such as edges or pixel attributes for frames/images of the video.

In this disclosure the term "object proposal region" denotes a region indicating an area within which it is proposed or detected that an object is present. The region may have any suitable form such as a rectangle, oval, circle or an arbitrary shaped polygon with an associated center coordinate, e.g. located at or near the center of gravity of the object.

In this description the term "height" is used to describe a size of objects and object proposal regions and denotes a vertical size or extent in a video frame, and may e.g. be expressed in pixels, meters, inches or any other suitable unit.

In this description the term "width" is used to describe a size of objects and object proposal regions and denotes a horizontal size or extent in a video frame, and may e.g. be expressed in pixels, meters, inches or any other suitable unit.

In one example, object proposal regions are received from a sliding classification window object detector, each object proposal region comprising a possible object or a candidate object. The size of candidate objects may be defined by the object proposal regions, e.g. in the form of a bounding box. The bounding box/object proposal region may surround the candidate object. Horizontal and vertical dimensions of the object proposal regions may be the width and height of the bounding box. Alternatively or in addition, the size of selected objects (e.g. each selected object proposal region comprising an object) may be defined by a bounding box that surrounds the selected object and the object proposal region coordinates may be the width and height of the bounding box. The coordinates may alternatively or in addition be the co-ordinates of the center of the bounding box.

In this disclosure the term "frame" denotes frames, images or video frames in a video. In other words the individual subsequent images, which when shown one after the other make out the video.

In this disclosure the term "spatial location" denotes a location of or relating to a captured frame, e.g. a row and column of a pixel comprised in a frame.

An important concept of the disclosed methods is to train two object detectors that can a localize left-right and a top-bottom border respectively of an object accurately, and then combine two sets of detected bounding boxes, BBs, or object proposal regions to obtain object proposal regions with proper aspect ratio and accurate position of the detected object indicated by the object proposal region.

The present disclosure overcomes the problem with varying aspect ratios of detected visual objects, by building low complex dual classification. A first classifier detects accurately left-right borders of the object, while the second classifier detects accurately bop-bottom borders of the object. The combination of these two classifiers give superior or at least improved localization of visual objects.

The proposed disclosure has the advantage that it improves consistency of detected object location and/or object boundaries. Further, the disclosure has the advantage that it reduces a false positive object detection ratio, by calculating a detection consistency measure indicative of overlapping ratios of object proposal regions and thereby rejecting incorrectly classified objects. The increase of computational complexity resulting therefrom is not significant, as both object detectors share large part of the image/frame feature extraction burden. An example of image/frame feature extraction is generation of Histograms of Oriented Gradients (HOG) followed by a linear mapping.

FIG. 1 illustrates objects 110, 120, 130, 140 detected in a first frame $F_n$ and a second subsequent frame $F_{n+1}$ in a video V according to one or more embodiments. The video may be captured by a camera in a mobile device, such as a smartphone or a tablet computer. Both of the frames $F_n$, $F_{n+1}$ depict the same electric equipment 100, although the viewing angle/distance to the object may vary between the frames $F_n$, $F_{n+1}$. Object proposal region information are detected using trained models based on the frames $F_n$, $F_{n+1}$ of the video V. In other words, objects 110, 120, 130, 140 are detected by a pair of object detectors/trained models. The output of the pair of object detectors/trained models are combined to provide combined object proposal regions 510, 520, 530, 540.

Optionally, an augmented reality video ARV can then be generated by overlaying the combined object proposal regions 510, 520, 530, 540 onto the frames $F_n$, $F_{n+1}$ of the video V to generated an augmented reality video ARV.

Figure 2:
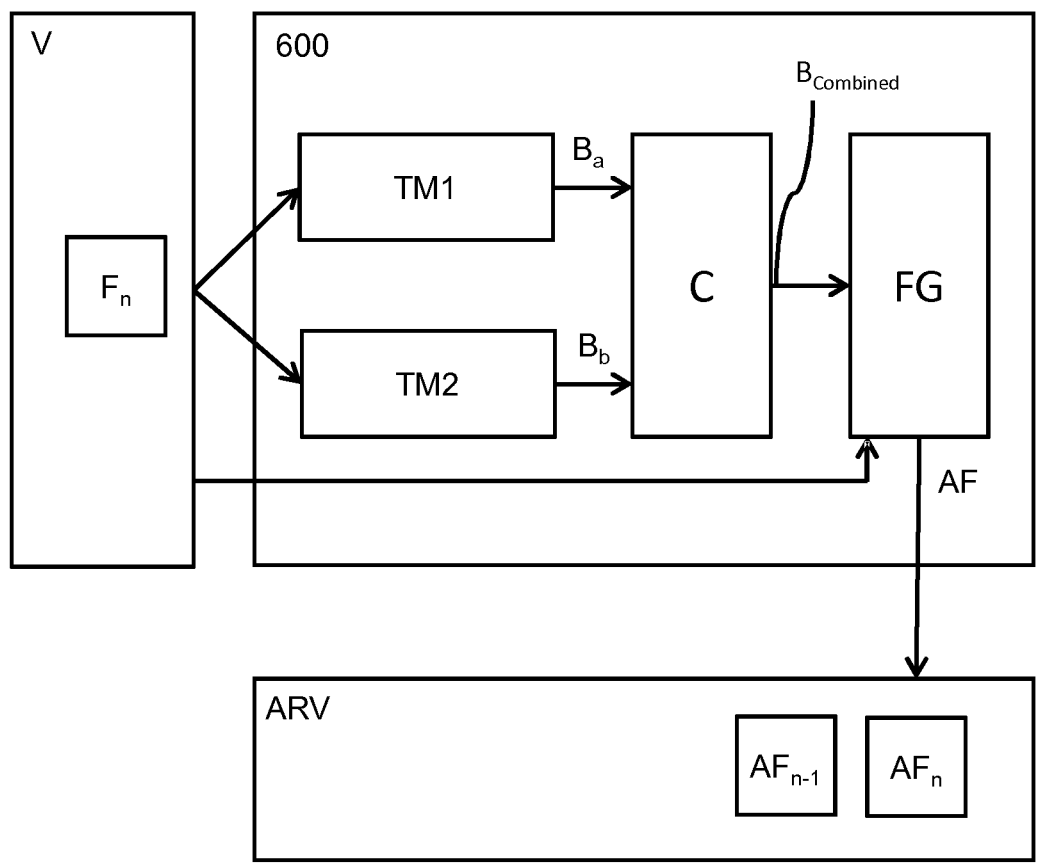
FIG. 2 illustrates a computer generating a video according to one or more embodiments.

FIG. 2 illustrates a computer 600 generating a video or augmented reality video ARV according to one or more embodiments. The computer 600 is typically a mobile device, such as a smartphone or tablet computer. The computer 600 may comprise functional modules such as a first trained model module TM1, a second trained model module TM2, a combiner module C and a frame generator module FG. It is understood that performing the functionality described below may equally be performed using a single functional module or by a plurality of modules and lies within the scope of the present disclosure.

The first and second trained model modules TM1, TM2 are configured to obtain a video V, e.g. depicting electric equipment, and comprising at least one frame $F_n$. The video V may be obtained e.g. by being captured by a sensor comprised in the computer 600, recorded by an external camera unit coupled to the computer 600, received from another computer or node or retrieved by the computer from a memory.

The video V may be obtained in different ways. For example, the video may be received as a video feed, for example a streamed video feed. The video feed may be obtained from a live recording, and may optionally be obtained in real time. Alternatively or additionally, the video segment may be obtained by retrieving a video segment that was previously recorded and stored in memory. For example, the video segment may be recorded on a storage medium such as a DVD or blu-ray disk, or a computer memory device such as a hard drive, flash drive, memory stick or memory card. The video may be a complete video, for example a film or episode of a program. Alternatively, the video may be an excerpt from a longer video. The video may be received as part of the longer video, and the computer may be used to split the longer video and create a shorter video. For example, footage depicting electric equipment may be received by the computer, which then creates a shorter video.

The first trained model module TM1 may be configured to provide first object proposal region information $B_a$, e.g. comprising object proposal regions 111a, 121a, 131a, 141a, having an accurate width. Object proposal regions are further described in relation to FIG. 1 and FIG. 2. The first trained model module TM1 may be configured to provide object proposal regions 111a, 121a, 131a, 141a, having an accurate width in the sense that they have a width proportional to a width of a corresponding detected object 110, 120, 130, 140 enclosed by the object proposal regions 111a, 121a, 131a, 141a. The provided object proposal regions 111a, 121a, 131a, 141a, have a height in proportion to the width. E.g. having a fixed aspect ratio, such as 5:1.

The second trained model module TM2 may be configured to provide second object proposal region information $B_b$, e.g. comprising object proposal regions 111b, 121b, 131b, 141b, having an accurate height. As mentioned in relation to FIG. 1, the second trained model module TM2 may be configured to provide object proposal regions 111b, 121b, 131b, 141b, having an accurate height in the sense that they have a height proportional to a height of a corresponding detected object 110, 120, 130, 140 enclosed by the object proposal regions 111b, 121b, 131b, 141b. The provide object proposal regions 111b, 121b, 131b, 141b, have a width in proportion to the height. E.g. the object proposal regions have a fixed aspect ratio.

In one embodiment, the first trained model module TM1 may be configured to provide object proposal regions having an accurate width by detecting first object proposal region information $B_a$ using a first trained model $M_a$ based on the frame $F_n$ of the video V. The first trained model $M_a$ may be configured to provide object proposal regions having an accurate width.

In one embodiment, the second trained model module TM2 may be configured to detect second object proposal region information $B_b$ using a second trained model $M_b$ based on the frame $F_n$ of the video V, the second trained model $M_b$ configured to provide object proposal regions having an accurate height.

The combiner module C of the computer 600 may be configured to receive first object proposal region information $B_a$ from the first trained model module TM1 and to receive the second object proposal region information $B_b$ from the second trained model module TM2. The combiner module C may further be configured to determine combined object proposal region information $B_{Combined}$, by combining object proposal regions of the first object proposal region information $B_a$ overlapping with object proposal regions of the second object proposal region information $B_b$.

The frame generator module FG of the computer 600 may be configured to generate an augmented reality video ARV by generating an augmented frame AF. The augmented frame AF may be generated by overlaying object proposal regions 510, 520, 530, 540 comprised in the combined object proposal region information $B_{Combined}$ onto the frame $F_n$ of the video V and adding the augmented frame AF to the augmented reality video ARV. The step of overlaying object proposal regions 510, 520, 530, 540 is further described in relation to FIG. 4 and FIG. 5.

In one embodiment, the combiner module C determines the combined object proposal region information $B_{combined}$ by further calculating object detection consistency measure/s indicative of overlapping ratios of object proposal regions. In other words, a measure indicative of to which extent the object proposal regions 111a, 121a, 131a, 141a of the first object proposal region information $B_a$ overlap with the object proposal regions 111b, 121b, 131b, 141b of the second object proposal region information $B_b$. The object proposal regions of the first object proposal region information $B_a$ and the object proposal regions of the second object proposal region information $B_b$ are in this embodiment considered as being overlapping only if the corresponding object detection consistency measure exceeds a threshold. In one embodiment, the object detection consistency measure is Intersection over Union and the threshold is set to 0.4. Other object detection consistency measures available to the skilled person may also be used within the scope of the present disclosure.

Figure 3:
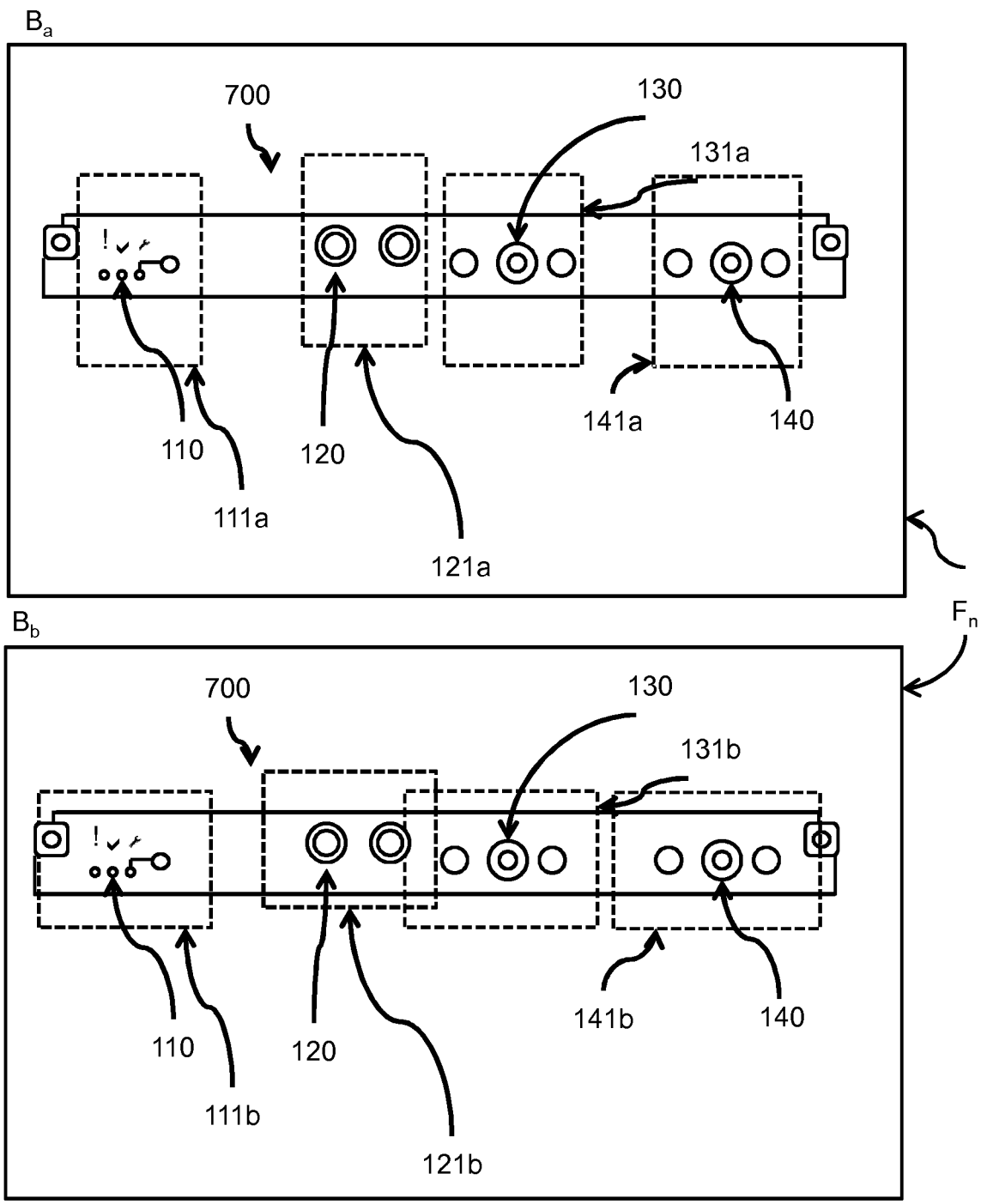
FIG. 3 illustrates detection of objects using trained models according to one or more embodiments.

FIG. 3 illustrates detection of objects using a plurality of trained models according to one or more embodiments. FIG. 3 illustrates how objects 110, 120, 130, 140 are detected in a frame $F_n$ of a video V. The frame $F_n$ of a video V may depict or represent electric equipment 700. The frame $F_n$ is illustrated by the large solid rectangles in FIG. 3 and the object proposal region information or the object proposal regions, representing detected objects, are shown as relatively smaller dashed rectangles in FIG. 3. Detection may performed by defining object proposal regions enclosing detected objects 110, 120, 130, 140. The detected objects 110, 120, 130, 140 may represent features of the electric equipment 700.

The detection of the first object proposal region information $B_a$ is illustrated by the top solid rectangle and detection of the second object proposal region information $B_b$ is illustrated by the bottom solid rectangle.

First object proposal region information $B_a$ is detected using a first trained model $M_a$ based on the frame $F_n$ of the video V. The first trained model $M_a$ is configured to provide object proposal regions having an accurate width. The first object proposal region information $B_a$ may comprise object proposal regions 111a, 121a, 131a, 141a, enclosing detected objects 110, 120, 130, 140 and having an accurate width. As described in relation to FIG. 2, the object proposal regions 111a, 121a, 131a, 141a, have an accurate width in the sense that they have a width proportional to a width of a corresponding detected object 110, 120, 130, 140 enclosed by the object proposal regions 111a, 121a, 131a, 141a. The object proposal regions 111a, 121a, 131a, 141a, have a height in proportion to the width. E.g. the object proposal regions are having a fixed aspect ratio. The height may be adjusted to the correct aspect ratio by padding pixels or lines to the object proposal regions.

Second object proposal region information $B_b$ is detected using a second trained model $M_b$ based on the frame $F_n$ of the video V. The second trained model $M_b$ is configured to provide object proposal regions having an accurate height in the sense that they have a height proportional to a height of a corresponding detected object 110, 120, 130, 140 enclosed by the object proposal regions 111b, 121b, 131b, 141b. The provided object proposal regions 111b, 121b, 131b, 141b, have a width in proportion to the height. E.g. the object proposal regions are having a fixed aspect ratio. The width may be adjusted to the correct aspect ratio by padding pixels or columns to the object proposal regions.

Figure 4:
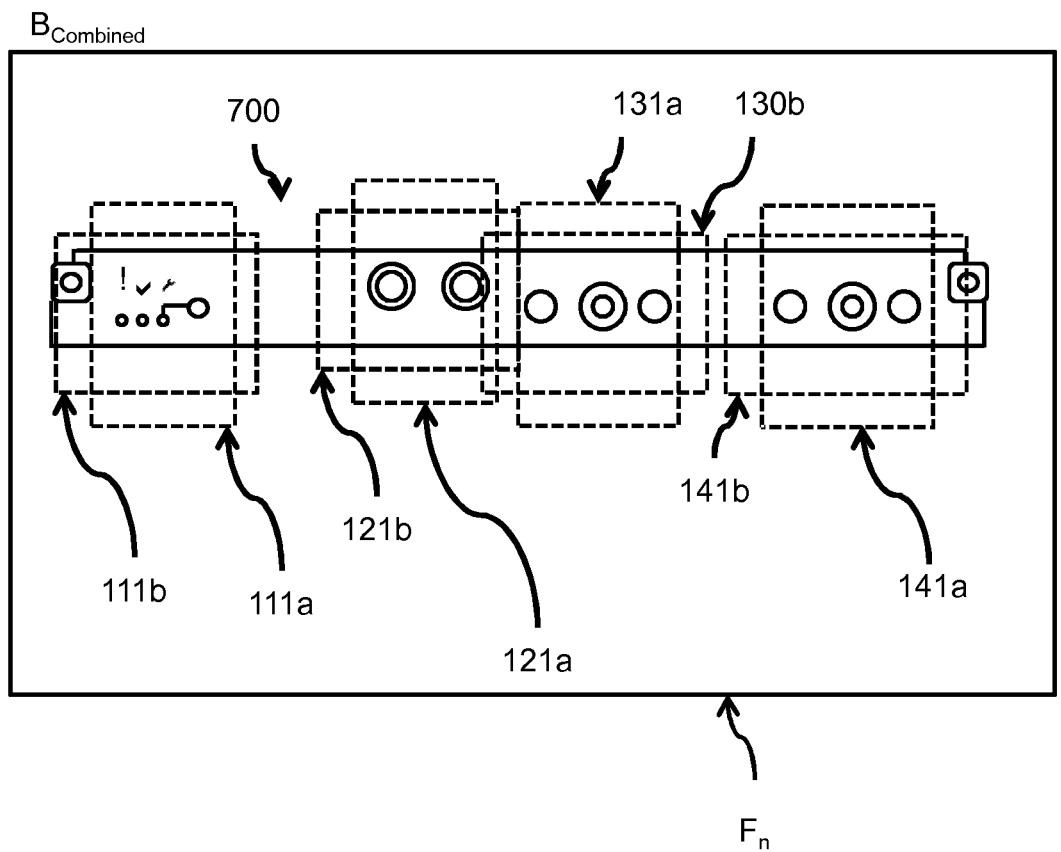
FIG. 4 illustrates combination of object proposal region information according to one or more embodiments.

FIG. 4 illustrates combination of object proposal region information $B_a$, $B_b$, according to one or more embodiments. FIG. 4 illustrates how the objects 110, 120, 130, 140 are detected in a frame $F_n$ of a video V. The frame $F_n$ of the video V may depict or represent electric equipment 700. Detection has been performed by defining object proposal regions enclosing detected objects 110, 120, 130, 140. First object proposal region information $B_a$ 111a, 121a, 131a, 141a, are shown overlaid onto to the second object proposal region information $B_b$ 111b, 121b, 131b, 141b and the electric equipment 700.

Combined object proposal region information $B_{Combined}$ is then determined by combining object proposal regions 111a, 121a, 131a, 141a, of the first object proposal region information $B_a$ overlapping with object proposal regions 111b, 121b, 131b, 141b of the second object proposal region information $B_b$. The combined object proposal region information $B_{Combined}$ is further described in relation to FIG. 5.

In one embodiment, the combined object proposal region information $B_{Combined}$ is determined by further calculating object detection consistency measure/s indicative of overlapping ratios of object proposal regions. In other words determining a measure indicative of to which extent an object proposal region of the first object proposal region information $B_a$ is overlapping an object proposal region, e.g. to which extent object proposal region 111a is overlapping with object proposal region 111b. The object proposal regions 111a, 121a, 131a, 141a, of the first object proposal region information $B_a$ and the object proposal regions 111b, 121b, 131b, 141b of the second object proposal region information $B_b$ are considered as being overlapping only if the corresponding object detection consistency measure exceeds a threshold.

In one embodiment, the object detection consistency measure is Intersection over Union and the threshold is set to 0.4. It is understood that the threshold can be set as per the specifications of the invention, i.e. a threshold value that best suits the application.

In one example, a coordinate system has been assigned to the frame $F_n$ of the video V, which has its origin at the top left corner of the outer solid rectangle illustrating the frame $F_n$. The detected object proposal regions 111a, 121a, 131a, 141a, of model $M_a$ may be represented as $B_a=(x_a, y_a, m_a, n_a)$, where $x_a, y_a$ represent the coordinate of top left corner of that bounding box, while $m_a, n_a$ represent the coordinate of bottom right corner. Similarly, the predicted bounding box for model $M_b$ is $B_b=(x_b, y_b, m_b, n_b)$.

With that notation the resulting combined object proposal region is calculated as the overlapping area of the two detected object proposal regions, e.g. object proposal region 111a overlapping with object proposal region 111b.

$$B^* = (x^*, y^*, m^*, n^*)$$

where
$x^* = \max(x_a, x_b)$
$y^* = \max(y_a, y_b)$
$m^* = \min(m_a, m_b)$
$n^* = \min(n_a, n_b)$ The resulting combined object proposal region gives more accurate location of the object position as it combines accurate left-right border estimation from model $M_a$ with accurate top-bottom border estimation from model $M_b$ The detector optionally outputs the estimated object position B* (center x,y; width/height, topleft/bottomright) to the ARV for visualization.

Figure 5:
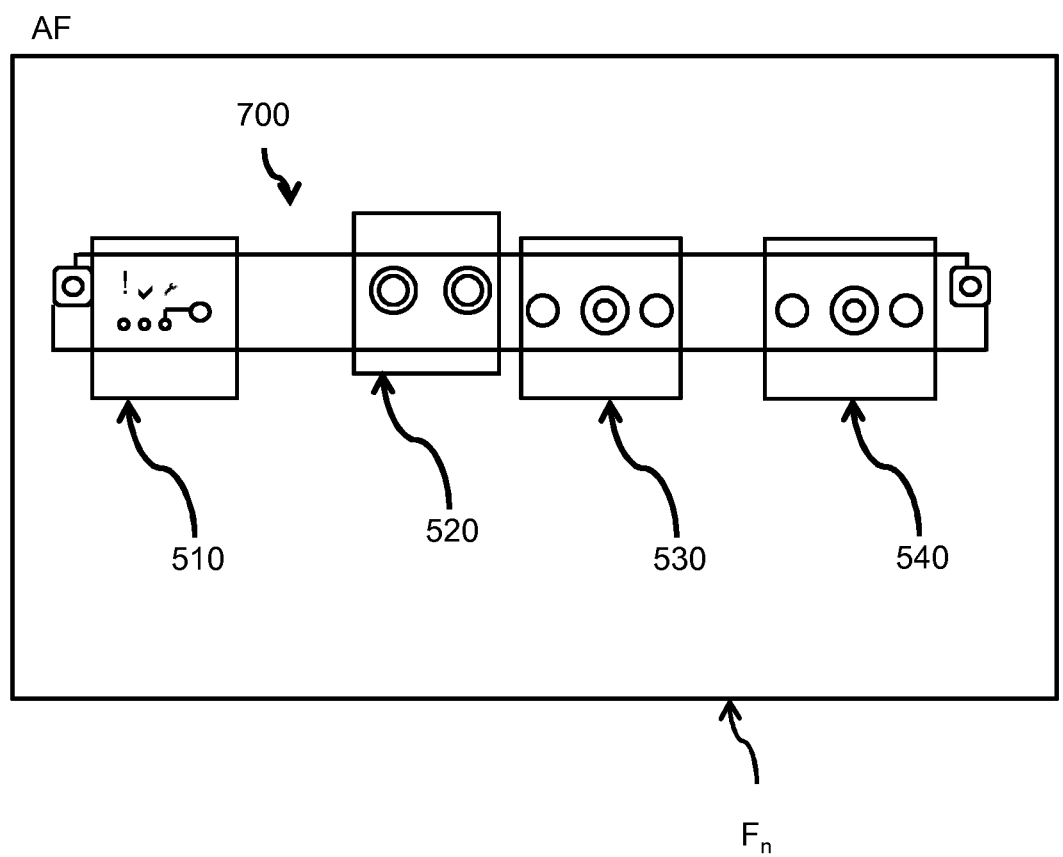
FIG. 5 illustrates combined object proposal region information according to one or more embodiments.

FIG. 5 illustrates combined object proposal region information according to one or more embodiments. FIG. 5 illustrates the combined object proposal region information $B_{Combined}$ comprising the combined object proposal regions 510, 520, 530, 540 resulting from the combination of object proposal region information $B_a$, $B_b$. The frame $F_n$ of the video V may depict or represent electric equipment 700. The combined object proposal regions 510, 520, 530, 540 are shown overlaid onto to the electric equipment 700.

FIG. 5 could also be seen as an example of the augmented frame AF.

Figure 6:
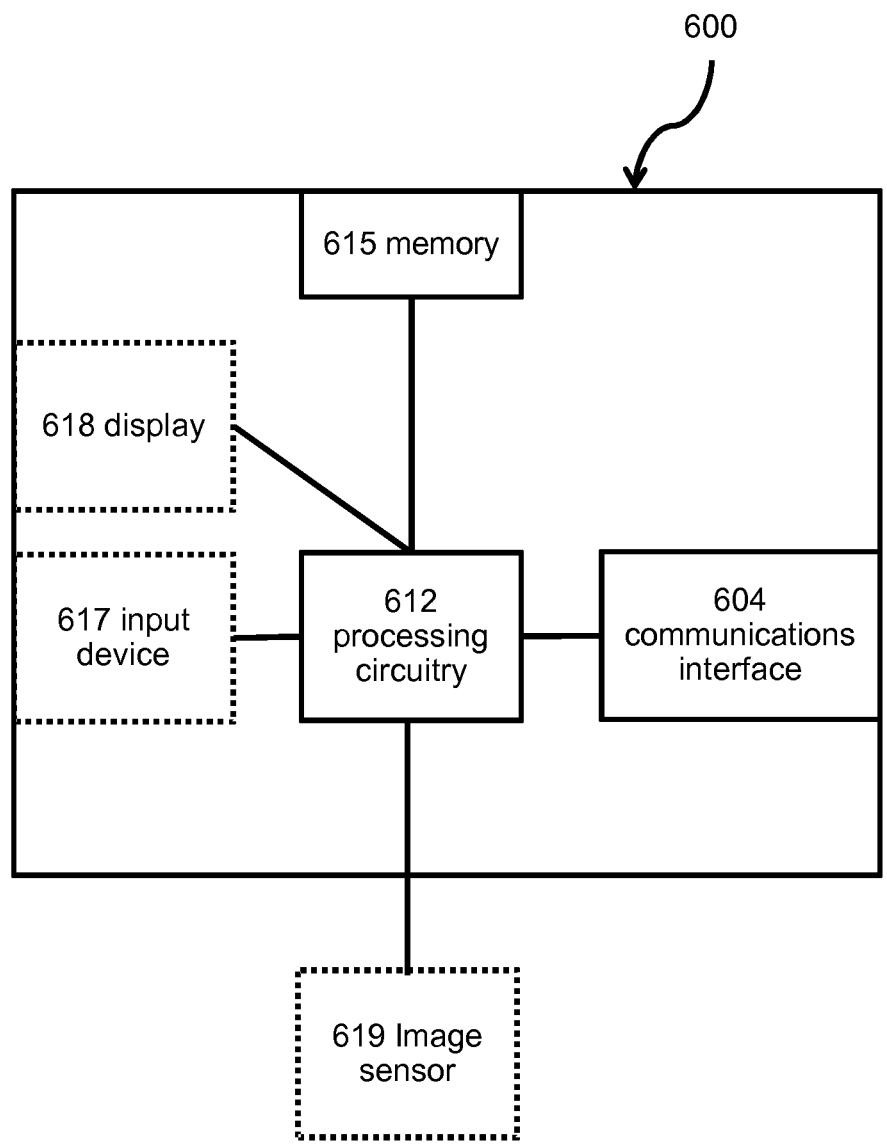
FIG. 6 shows details of a computer according to one or more embodiments.

FIG. 6 shows details of a computer 600 according to one or more embodiments. The computer 600 may be in the form of a selection of any of a mobile device, a smartphone, a tablet computer, a smart-watch etc. The computer 600 may comprise processing circuitry 612 optionally communicatively coupled to a communications interface 604 for wired and/or wireless communication. Further, the computer 600 may further comprise at least one optional antenna (not shown in figure). The antenna may be coupled to a transceiver of the communications interface 604 and is configured to transmit and/or emit and/or receive a wireless signals in a wireless communication system. In one example, the processing circuitry 612 may be any of a selection of processor and/or a central processing unit and/or processor modules and/or multiple processors configured to cooperate with each-other. Further, the computer 600 may further comprise a memory 615. The memory 615 may contain instructions executable by the processing circuitry to perform any of the methods and/or method steps described herein.

The communications interface 604, e.g. the wireless transceiver and/or a wired/wireless communications network adapter, which is configured to send and/or receive data values or parameters as a signal to or from the processing circuitry 612 to or from other external nodes, e.g. a video streaming server (not shown in the figure). In an embodiment, the communications interface communicates directly between nodes or via a communications network.

In one or more embodiments the computer 600 may further comprise an input device 617, configured to receive input or indications from a user and send a user-input signal indicative of the user input or indications to the processing circuitry 612.

In one or more embodiments the computer 600 may further comprise a display 618 configured to receive a display signal indicative of rendered objects, such as text or graphical user input objects, from the processing circuitry 612 and to display the received signal as objects, such as text or graphical user input objects.

In one embodiment the display 618 is integrated with the user input device 617 and is configured to receive a display signal indicative of rendered objects, such as text or graphical user input objects, from the processing circuitry 612 and to display the received signal as objects, such as text or graphical user input objects, and/or configured to receive input or indications from a user and send a user-input signal indicative of the user input or indications to the processing circuitry 612.

In one or more embodiments the computer 600 may further comprise one or more sensors 619, such as an image sensor e.g. as a camera, configured to capture a video.

In embodiments, the processing circuitry 612 is communicatively coupled to the memory 615 and/or the communications interface 604 and/or the input device 617 and/or the display 618 and/or the one or more sensors 619.

In embodiments, the communications interface and/or transceiver 604 communicates using wired and/or wireless communication techniques. In embodiments, the one or more memory 615 may comprise a selection of a hard RAM, disk drive, a floppy disk drive, a magnetic tape drive, an optical disk drive, a CD or DVD drive (R or RW), or other removable or fixed media drive.

In a further embodiment, the computer 600 may further comprise and/or be coupled to one or more additional sensors (not shown) configured to receive and/or obtain and/or measure physical properties pertaining to the computer or the environment of the computer, and send one or more sensor signals indicative of the physical properties to the processing circuitry 612.

It is to be understood that a computer comprises any suitable combination of hardware and/or software needed to perform the tasks, features, functions and methods disclosed herein. Moreover, while the components of the computer are depicted as single boxes located within a larger box, or nested within multiple boxes, in practice, a computer may comprise multiple different physical components that make up a single illustrated component (e.g., memory 615 may comprise multiple separate hard drives as well as multiple RAM modules).

Similarly, the computer 600 may be composed of multiple physically separate components, which may each have their own respective components.

The communications interface 604 may also include multiple sets of various illustrated components for different wireless technologies, such as, for example, GSM, WCDMA, LTE, NR, WiFi, or Bluetooth wireless technologies. These wireless technologies may be integrated into the same or different chip or set of chips and other components within the computer 600.

Processing circuitry 612 is configured to perform any determining, calculating, or similar operations (e.g., certain obtaining operations) described herein as being provided by a computer 600. These operations performed by processing circuitry 612 may include processing information obtained by processing circuitry 612 by, for example, converting the obtained information into other information, comparing the obtained information or converted information to information stored in the network node, and/or performing one or more operations based on the obtained information or converted information, and as a result of said processing making a determination.

Processing circuitry 612 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other computer 600 components, such as device readable medium, computer 600 functionality. For example, processing circuitry 612 may execute instructions stored in device readable medium 615 or in memory within processing circuitry 612. Such functionality may include providing any of the various wireless features, functions, or benefits discussed herein. In some embodiments, processing circuitry 612 may include a system on a chip (SOC).

In some embodiments, processing circuitry 612 may include one or more of radio frequency (RF) transceiver circuitry and baseband processing circuitry. In some embodiments, radio frequency (RF) transceiver circuitry and baseband processing circuitry may be on separate chips (or sets of chips), boards, or units, such as radio units and digital units. In alternative embodiments, part or all of RF transceiver circuitry and baseband processing circuitry may be on the same chip or set of chips, boards, or units In certain embodiments, some or all of the functionality described herein as being provided by a computer 600 may be performed by processing circuitry 612 executing instructions stored on device readable medium 615 or memory within processing circuitry 612. In alternative embodiments, some or all of the functionality may be provided by processing circuitry 612 without executing instructions stored on a separate or discrete device readable medium, such as in a hard-wired manner. In any of those embodiments, whether executing instructions stored on a device readable storage medium or not, processing circuitry 612 can be configured to perform the described functionality. The benefits provided by such functionality are not limited to processing circuitry 612 alone or to other components of computer 600, but are enjoyed by computer 600 as a whole, and/or by end users.

Device readable medium 615 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 612.

Device readable medium 615 may store any suitable instructions, data or information, including a computer program, software, an application including one or more of logic, rules, code, tables, etc. and/or other instructions capable of being executed by processing circuitry 612 and, utilized by computer 600. Device readable medium QQ180 may be used to store any calculations made by processing circuitry 612 and/or any data received via interface 604. In some embodiments, processing circuitry 612 and device readable medium 615 may be considered to be integrated.

Interface 604 is used in the wired or wireless communication of signaling and/or data between computer 600 and other nodes. Interface 604 may comprise port(s)/terminal(s) to send and receive data, for example to and from computer 600 over a wired connection. Interface 604 also includes radio front end circuitry that may be coupled to, or in certain embodiments a part of, an antenna. Radio front end circuitry may comprise filters and amplifiers. Radio front end circuitry may be connected to the antenna and/or processing circuitry 612.

Examples of a computer 600 include, but are not limited to, a smart phone, a mobile phone, a cell phone, a voice over IP (VoIP) phone, a wireless local loop phone, a a tablet computer, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

The communication interface may 604 encompass wired and/or wireless networks such as a local-area network (LAN), a wide-area network (WAN), a computer network, a wireless network, a telecommunications network, another like network or any combination thereof. The communication interface may be configured to include a receiver and a transmitter interface used to communicate with one or more other devices over a communication network according to one or more communication protocols, such as Ethernet, TCP/IP, SONET, ATM, optical, electrical, and the like). The transmitter and receiver interface may share circuit components, software or firmware, or alternatively may be implemented separately.

In one embodiment, a computer 600 is provided and is configured to perform any of the method steps described herein.

In one embodiment, a computer program is provided and comprises computer-executable instructions for causing a computer, when the computer-executable instructions are executed on a processing unit comprised in the computer, to perform any of the method steps described herein.

In one embodiment, a computer program product is provided and comprises a computer-readable storage medium, the computer-readable storage medium having the computer program above embodied therein.

In one embodiment, a carrier is provided and contains the computer program above. The carrier may be any one of an electronic signal, an optical signal, a radio signal, or a computer readable storage medium.

Figure 7:
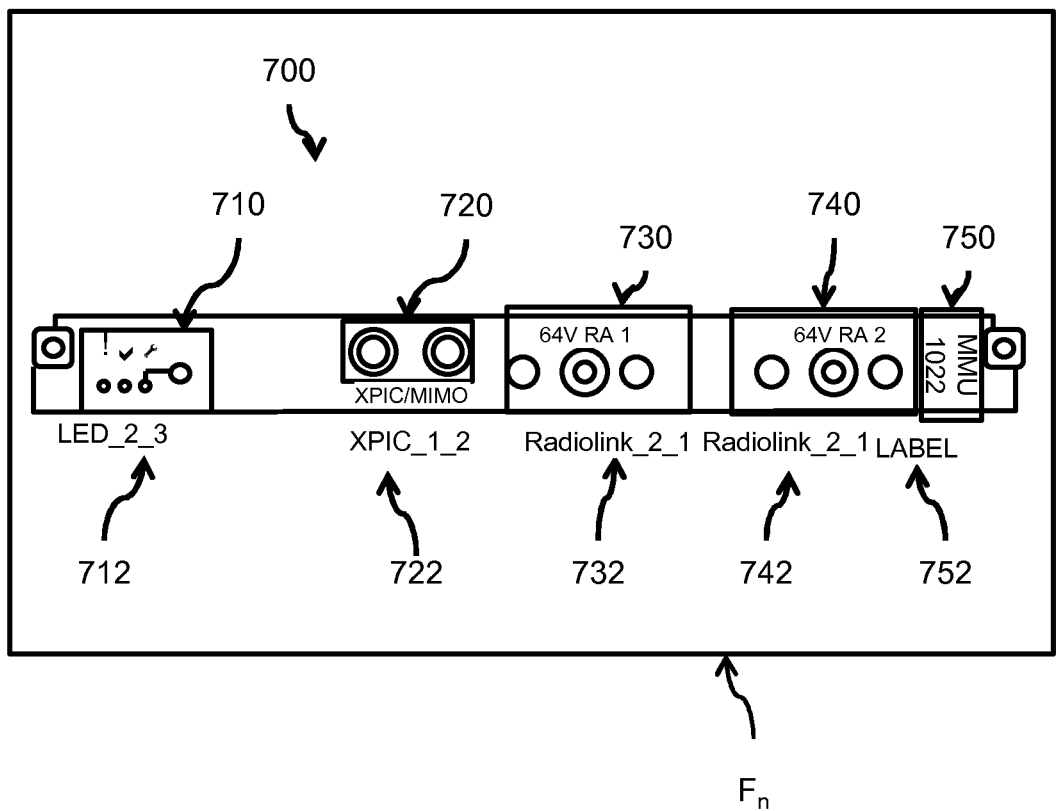
FIG. 7 shows an example of a generated augmented frame according to one or more embodiments.

FIG. 7 shows an example of an augmented frame according to one or more embodiments. FIG. 7 illustrates an augmented frame AF generated by overlaying combined object proposal regions 710, 720, 730, 740, 750 comprised in the combined object proposal region information $B_{Combined}$ onto the frame $F_n$ of the video V. Optionally, combined object proposal region information $B_{Combined}$ may further comprise labels 712, 722, 732, 742, 752 associated to each object proposal regions 710, 720, 730, 740, 750 and being descriptive of the detected objects enclosed by the object proposal regions 710, 720, 730, 740, 750, e.g. a class of the detected object.

The generated augmented frame AF may optionally further be added to the augmented reality video ARV.

FIG. 8 shows a flowchart of a method 800 according to one or more embodiments. The method 800 may be performed by a portable computer device (600) configured to generate an augmented reality video ARV, the method comprises:

Step 810: detecting first object proposal region information $B_a$ using a first trained model $M_a$ based on a frame $F_n$ of a video V, the first trained model $M_a$ configured to provide object proposal regions having an accurate width.

Step 820: detecting second object proposal region information $B_b$ using a second trained model $M_b$ based on the frame $F_n$ of the video V, the second trained model $M_b$ configured to provide object proposal regions having an accurate height.

In one embodiment, a pair of trained models $M_a$, $M_b$ are used for each object.

Step 830: determining combined object proposal region information $B_{Combined}$, by combining object proposal regions of the first object proposal region information $B_a$ overlapping with object proposal regions of the second object proposal region information $B_b$.

Step 840: generating an augmented reality video ARV by generating an augmented frame AF, wherein the augmented frame AF is generated by overlaying object proposal regions comprised in the combined object proposal region information $B_{Combined}$ onto the frame $F_n$ of the video V and optionally adding the augmented frame AF to the augmented reality video ARV.

In one embodiment, the combined object proposal region information $B_{Combined}$ is determined by further calculating object detection consistency measure/s indicative of overlapping ratios of object proposal regions. In one embodiment, and wherein the object proposal regions of the first object proposal region information $B_a$ and the object proposal regions of the second object proposal region information $B_b$ are considered as being overlapping only if the corresponding object detection consistency measure exceeds a threshold.

In one embodiment, the object detection consistency measure is Intersection over Union and/or the threshold is set to 0.4.

An advantage of these embodiments is that false positive object detection ratio is reduced by calculating object the detection consistency measure indicative of overlapping ratios of object proposal regions, thereby rejecting incorrectly classified objects.

In one embodiment, the models $M_a$, $M_b$ are trained by detecting training object proposal region information $B_T$, using an object detector, based on a training frame $F_{Training}$ of a training video $V_{Training}$. The object detector used may be any of the object detectors mentioned in the background section, such as "Rapid object detection using a boosted cascade of simple features", in Proc. IEEE Conf. Computer Vision and Pattern Recognition, 2001 and in P. Dollar, R. Appel, S. Belongie, and P. Perona, "Fast feature pyramids for object detection", IEEE Transactions on Pattern Analysis and Machine Intelligence, 2014. The training object proposal region information $B_T$ may comprise object proposal regions having varying aspect ratios. Optionally, the training object proposal region information $B_T$ may be adjusted to two standard sizes by padding lines or columns of pixels to the top or bottom.

The models $M_a$, $M_b$ are further trained by generating a first training set $B_{Ta}$ by maintaining width and adjusting height of object proposal regions of the training object proposal region information $B_T$ to a first aspect ratio. In other words object proposal regions of the first training set $B_{Ta}$ have the same width as object proposal regions of object proposal region information $B_T$. The object proposal regions of the first training set $B_{Ta}$ have a height set by the width and the first aspect ratio.

The models $M_a$, $M_b$ are further trained by generating a second training set $B_{Tb}$ by maintaining height and adjusting width of object proposal regions of the training object proposal region information $B_T$ to a second aspect ratio. In other words object proposal regions of the second training set $B_{Tb}$ have the same height as object proposal regions of object proposal region information $B_T$. The object proposal regions of the second training set $B_{Ta}$ have a height set by the width and the second aspect ratio.

The models $M_a$, $M_b$ are further trained by scaling a first set of objects comprised by the object proposal regions of the first training set $B_{Ta}$ to a first fixed size, e.g. 50×10 pixels.

The models $M_a$, $M_b$ are further trained by scaling a second set of objects comprised by the object proposal regions of the second training set $B_{Tb}$ to a second fixed size, e.g. 70×10 pixels.

The models $M_a$, $M_b$ are further trained by training the first trained model $M_a$ using the first set of objects, and training the second trained model $M_b$ using the second set of objects.

In one embodiment, the first aspect ratio comprises an aspect ratio of 5:1 and the second aspect ratio comprises an aspect ratio of 7:1.

In one embodiment, a fully automatic procedure is used to determine the values of the two fixed aspect ratios. The values are determined as 1% and 99% quantile of the aspect ratios in the training set of a particular object, e.g. training object proposal region information $B_T$.

In one example, the first aspect ratio is fixed to 1.45 and the second aspect ratio is fixed to 2.28, meaning that we have 99% of the objects that fit into this range with just padding lines of pixels from above-below or columns of pixels from left-right. The 1% that don't fit could be considered outliers from the labelling process.

This process of 1) sorting of object proposal regions or bounding boxes aspect ratios and 2) selecting 1% and 99% quantile is repeated for the training set of each object. In that way two datasets, with different aspect ratios, e.g. 1.45 and 2.28, are created for every available training set.

In one use case embodiment, the varying aspect ratio of original annotations, e.g. a labeled dataset used for training, and/or the object proposal region information $B_T$ to two fixed sizes. The bounding boxes or object proposal regions varies in size, and here we make all bounding boxes the same sizes by padding top or bottom of the object proposal regions.

The original width is then used and the height is adjusted to be a fixed fraction of the width, i.e. for model $M_a$.

The original height is used and the width adjusted to be a fixed fraction of the height, i.e. for model $M_b$.

To avoid losing information of a detected object, a relatively small fixed aspect ratio is applied for model $M_a$, otherwise, a relatively large fixed aspect ratio is used for model $M_b$. Therefore, standardized object proposal regions are always the extended region of the annotated object proposal regions of $B_T$, with either padding below and above the object or padding on the left and right of the object.

The version of datasets $B_{Ta}$, keeping original width of annotations maintains accurate information of left-right border, but with uncertainty of top-bottom border. Therefore, the model, denoted as $M_a$ trained with this dataset can localize the left-right border of object accurately. Similarly, the detected object proposal regions of the other model, denoted as $M_b$, provide more accurate positions/estimations of top-bottom borders.

The previous algorithmic steps have created two datasets $B_{Ta}$, $B_{Tb}$, with fixed aspect ratios compared to the original labeled dataset $B_T$ comprising object proposal regions having varying aspect ratios. I.e. in which annotations/aspect ratios of the object proposal regions have completely uncontrolled dimensions.

Further, these two datasets $B_{Ta}$, $B_{Tb}$, are re-scaled to a fixed resolution to train the fixed classification window. As an example, if aspect ratio for model $M_a$ is 5:1, all labeled objects are rescaled to fixed size of 50×10 pixels.

Train respectively two classification models $M_a$ and $M_b$ on these two standardized datasets. The models $M_a$ and $M_b$ e.g. comprising a number of weights to combine the image features. The image/frame features could be any low-level features, such as edges or pixel attributes for images.

In a further use case embodiment, a frame $F_n$ is presented to the visual object detector for identification and localization of the objects of interest. For each object, two detectors are always applied per object.

The two training models $M_a$ and $M_b$ are applied and produce two sets of object proposal regions $B_a$ and $B_b$.

A check is performed that these two object proposal regions are positioned on the same object by calculating Intersection over Union, IoU, between them.

This may be checked as

IF IoU>0.4 continue to next step

OTHERWISE terminate detection of this object and declare it as false positive

END

Two sets of detected object proposal regions are combined to obtain object proposal region B* with proper aspect ratio and accurate position, only if IoU>0.4.

For the sake of notation, it is assumed that the coordinate system has its origin at the top left corner of the frame/image. The detected object proposal regions of model $M_a$ are represented as $B_a=(x_a, y_a, m_a, n_a)$, where $x_a, y_a$ represent the coordinate of top left corner of that bounding box, while $m_a$, $n_a$ represent the coordinate of bottom right corner. Similarly, the predicted bounding box or object proposal region for model $M_b$ is $B_b=(x_b, y_b, m_b, n_b)$.

With that notation the resulting object proposal region B* is calculated as the overlapping area of the two detected object proposal regions:

$$B^* = (x^*, y^*, m^*, n^*)$$

where
$x^* = \max(x_a, x_b)$
$y^* = \max(y_a, y_b)$
$m^* = \min(m_a, m_b)$
$n^* = \min(n_a, n_b)$ The resulting object proposal region gives more accurate location of the detected object position as it combines accurate left-right border estimation from model $M_a$ with accurate top-bottom border estimation from model $M_b$ The computer 600 may optionally further output the estimated object position B* (cenrer x,y; width/height, topleft/bottomright) to the Augmented Reality Video ARV for visualization, overlaid over the image frame $F_n$.

Finally, it should be understood that the invention is not limited to the embodiments described above, but also relates to and incorporates all embodiments within the scope of the appended independent claims.

The invention claimed is:

1. A method performed by a portable computer device configured to generate an augmented reality video, the method comprising:
   detecting first object proposal region information using a first trained model based on a frame of a video, the first trained model configured to provide object proposal regions having a width that is proportional to a width of a corresponding detected object;
   detecting second object proposal region information using a second trained model based on the frame of the video, the second trained model being disposed in parallel to the first trained model and configured to provide object proposal regions having a height that is proportional to a width of a corresponding detected object and;
   determining combined object proposal region information by combining object proposal regions of the first object proposal region information overlapping with object proposal regions of the second object proposal region information, wherein the combining combines a left-right border estimation output by the first trained model with a top-bottom estimation output by the second trained model; and
   generating an augmented reality video by generating an augmented frame, wherein the augmented frame is generated by overlaying object proposal regions comprised in the combined object proposal region information onto the frame of the video and adding the augmented frame to the augmented reality video.

2. The method of claim 1, wherein the combined object proposal region information is determined by further:
   calculating one or more object detection consistency measures indicative of overlapping ratios of object proposal regions; and
   wherein the object proposal regions of the first object proposal region information and the object proposal regions of the second object proposal region information are considered as being overlapping only if a corresponding object detection consistency measure exceeds a threshold.

3. The method of claim 2, wherein the corresponding object detection consistency measure is Intersection over Union and the threshold is 0.4.

4. The method of claim 1, wherein the first and second trained models are trained by:
   detecting training object proposal region information, using an object detector, based on a training frame of a training video, the training object proposal region information comprising object proposal regions having varying aspect ratios;
   generating a first training set by maintaining width and adjusting height of object proposal regions of the training object proposal region information to a first aspect ratio;
   generating a second training set by maintaining height and adjusting width of object proposal regions of the training object proposal region information to a second aspect ratio;
   scaling a first set of objects comprised by the object proposal regions of the first training set to a first fixed size;
   scaling a second set of objects comprised by the object proposal regions of the second training set to a second fixed size;
   training the first trained model using the first set of objects; and
   training the second trained model using the second set of objects.

5. The method of claim 4, wherein the first aspect ratio is 5:1 and the second aspect ratio is 7:1.

6. A portable computer device configured to generate an augmented reality video, comprising:
   processing circuitry;
   memory containing instructions executable by the processing circuitry whereby the portable computer device is operative to:
   detect first object proposal region information using a first trained model based on a frame of a video, the first trained model configured to provide object proposal regions having a width that is proportional to a width of a corresponding detected object;
   detect second object proposal region information using a second trained model based on the frame of the video, the second trained model being disposed in parallel to the first trained model and configured to provide object proposal regions having a height that is proportional to a width of a corresponding detected object;
   determine combined object proposal region information by combining object proposal regions of the first object proposal region information overlapping with object proposal regions of the second object proposal region information, wherein the combining combines a left-right border estimation output by the first trained model with a top-bottom estimation output by the second trained model; and
   generate an augmented reality video by generating an augmented frame, wherein the augmented frame is generated by overlaying object proposal regions comprised in the combined object proposal region information onto the frame of the video and adding the augmented frame to the augmented reality video.

7. The device of claim 6, wherein the instructions are such that the portable computer device is operative to determine the combined object proposal region information by:
   calculating one or more object detection consistency measures indicative of overlapping ratios of object proposal regions; and
   wherein the object proposal regions of the first object proposal region information and the object proposal regions of the second object proposal region information are considered as being overlapping only if a corresponding object detection consistency measure exceeds a threshold.

8. The device of claim 7, wherein the corresponding object detection consistency measure comprises Intersection over Union and the threshold is 0.4.

9. The device of claim 6, wherein the instructions are such that the portable computer device is operative to train the models by:
   detecting training object proposal region information, using an object detector, based on a training frame of a training video, the training object proposal region information comprising object proposal regions having varying aspect ratios;
   generating a first training set by maintaining width and adjusting height of object proposal regions of the training object proposal region information to a first aspect ratio;
   generating a second training set by maintaining height and adjusting width of object proposal regions of the training object proposal region information to a second aspect ratio;
   scaling a first set of objects comprised by the object proposal regions of the first training set to a first fixed size;
   scaling a second set of objects comprised by the object proposal regions of the second training set to a second fixed size;
   training the first trained model using the first set of objects; and
   training the second trained model using the second set of objects.

10. The device of claim 9, wherein the first aspect ratio is 5:1 and the second aspect ratio is 7:1.

11. A non-transitory computer readable recording medium storing a computer program product for controlling a portable computer device for generating an augmented reality video, the computer program product comprising program instructions which, when run on processing circuitry of the portable computer device, causes the portable computer device to:
   detect first object proposal region information using a first trained model based on a frame of a video, the first trained model configured to provide object proposal regions having a width that is proportional to a width of a corresponding detected object;
   detect second object proposal region information using a second trained model based on the frame of the video, the second trained model being disposed in parallel to the first trained model and configured to provide object proposal regions having a height that is proportional to a width of a corresponding detected object;
   determine combined object proposal region information by combining object proposal regions of the first object proposal region information overlapping with object proposal regions of the second object proposal region information, wherein the combining combines a left-right border estimation output by the first trained model with a top-bottom estimation output by the second trained model; and
   generate an augmented reality video by generating an augmented frame, wherein the augmented frame is generated by overlaying object proposal regions comprised in the combined object proposal region information onto the frame of the video and adding the augmented frame to the augmented reality video.

12. The non-transitory computer readable recording medium of claim 11, wherein the program instructions are such that the portable computer device is operative to determine the combined object proposal region information by:
   calculating one or more object detection consistency measures indicative of overlapping ratios of object proposal regions; and
   wherein the object proposal regions of the first object proposal region information and the object proposal regions of the second object proposal region information are considered as being overlapping only if a corresponding object detection consistency measure exceeds a threshold.

13. The non-transitory computer readable recording medium of claim 12, wherein the object detection consistency measure comprises Intersection over Union and the threshold is 0.4.

14. The non-transitory computer readable recording medium of claim 11, wherein the program instructions are such that the portable computer device is operative to train the models by:
   detecting training object proposal region information, using an object detector, based on a training frame of a training video, the training object proposal region information comprising object proposal regions having varying aspect ratios;
   generating a first training set by maintaining width and adjusting height of object proposal regions of the training object proposal region information to a first aspect ratio;
   generating a second training set by maintaining height and adjusting width of object proposal regions of the training object proposal region information to a second aspect ratio;
   scaling a first set of objects comprised by the object proposal regions of the first training set to a first fixed size;
   scaling a second set of objects comprised by the object proposal regions of the second training set to a second fixed size;
   training the first trained model using the first set of objects; and
   training the second trained model using the second set of objects.

15. The non-transitory computer readable recording medium of claim 14, wherein the first aspect ratio is 5:1 and the second aspect ratio is 7:1.

* * * * *